United States Patent [19]

Akiyama et al.

[11] Patent Number: 4,673,836
[45] Date of Patent: Jun. 16, 1987

[54] MOTOR WITH INTEGRAL BRACKET BRUSH HOLDER

[75] Inventors: Tsutomu Akiyama, Ohta; Toshiyuki Kobayashi, Kiryu, all of Japan

[73] Assignee: Mitsuba Electric Manufacturing Co., Ltd., Gunma, Japan

[21] Appl. No.: 765,365

[22] Filed: Aug. 13, 1985

[30] Foreign Application Priority Data

Aug. 14, 1984 [JP] Japan ............................ 59-124482[U]

[51] Int. Cl.⁴ ..................... H02K 5/16; H02K 15/00; H01R 39/38
[52] U.S. Cl. ..................................... 310/239; 310/43; 310/89
[58] Field of Search ............... 310/42, 43, 71, 89, 310/239, 242, 245, 247, 91

[56] References Cited

U.S. PATENT DOCUMENTS

| | | | |
|---|---|---|---|
| 2,683,826 | 7/1954 | Staak | 310/239 |
| 2,894,156 | 7/1959 | Kent | 310/239 |
| 3,339,098 | 8/1967 | Burrows et al. | 310/239 |
| 3,601,507 | 8/1971 | Harris | 310/67 |
| 3,745,393 | 7/1973 | Spors | 310/239 |
| 4,357,552 | 11/1982 | MacMillan | 310/43 |
| 4,445,060 | 4/1984 | Rühle et al. | 310/42 |
| 4,553,442 | 11/1985 | Mazzorana | 310/43 |

FOREIGN PATENT DOCUMENTS 55-68844  5/1980  Japan .

Primary Examiner—Patrick R. Salce
Assistant Examiner—D. L. Rebsch
Attorney, Agent, or Firm—Kane, Dalsimer, Kane, Sullivan and Kurucz

[57] ABSTRACT

A revolving electric machine wherein a brush holder formed of resin is solidly secured to a bracket and this bracket is jointed to an opening of a yoke. The bracket is formed into a thin plate shape. A portion of the bracket is clamped from the opposite side by a resin material of the brush holder, whereby the bracket is integrally formed with the brush holder. A faucet joint portion of the brush holder is formed when the brush holder is formed of resin and the faucet joint portion is faucet-jointed to the opening of the yoke, whereby the bracket is center-aligned with the yoke. One of the terminals of a brush penetrates through a resin material of the brush holder and is extracted to the outside. The outer of the terminals of the brush is connected to the outside of the bracket.

7 Claims, 9 Drawing Figures

FIG.8
FIG.9
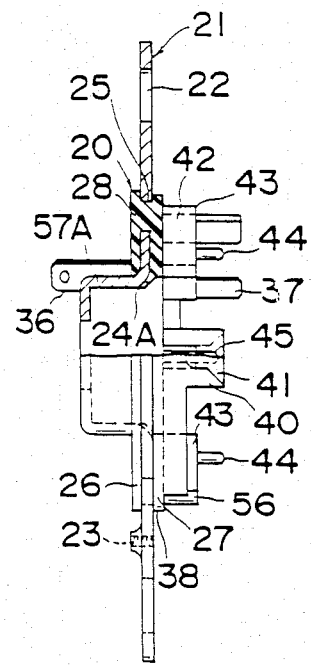
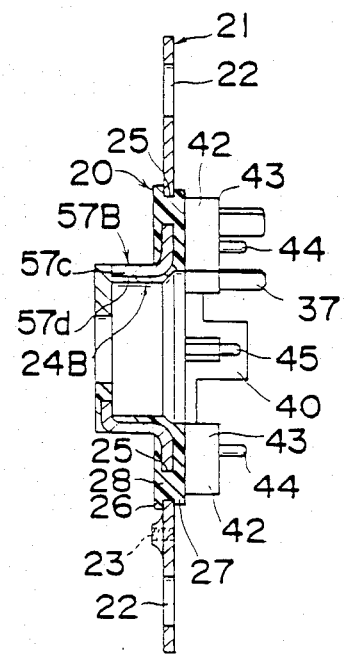

MOTOR WITH INTEGRAL BRACKET BRUSH HOLDER

BACKGROUND OF THE INVENTION

1. Field of the Invention

This invention relates to revolving electric machines, and more particularly to improvements in connecting construction of a yoke, a bracket and a brush holder, which is effective for use in a starter motor for example.

2. Description of the Prior Art

As the conventional starter motor, there has been provided one wherein a bracket is formed by aluminum die casting, a brush holder formed of resin is integrally fastened to this bracket through screws, and this bracket is faucet-jointed to an opening of a yoke.

However, the above-described starter motor presents the following disadvantages.

(1) Since the bracket is formed by aluminum die casting, the bracket is increased in wall thickness and weight of the bracket out of necessity of the forming, whereby the starter motor as a whole is increased in length and weight.

(2) Since the brush holder is fastened to the bracket through screws, whereby the number of parts and the number of man-hours for assembling are increased, productivity is lowered.

SUMMARY OF THE INVENTION

The present invention has been developed to obviate the above-described disadvantages of the prior art and has as its object the provision of a revolving electric machine compact in size, light in weight and high in productivity.

To this end, the present invention contemplates that a bracket is formed into a thin plate shape, the bracket is integrally formed with a brush holder made of resin to render the bracket thin in thickness and light in weight and means for fastening the bracket to the brush holder is omitted.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which:

FIGS. 8 and 9 are a partially cutaway side view and a sectional side view of the essential portions showing other embodiments of the present invention.

DETAILED DESCRIPTION OF THE PREFERRED EMBODIMENTS

Figure 1:
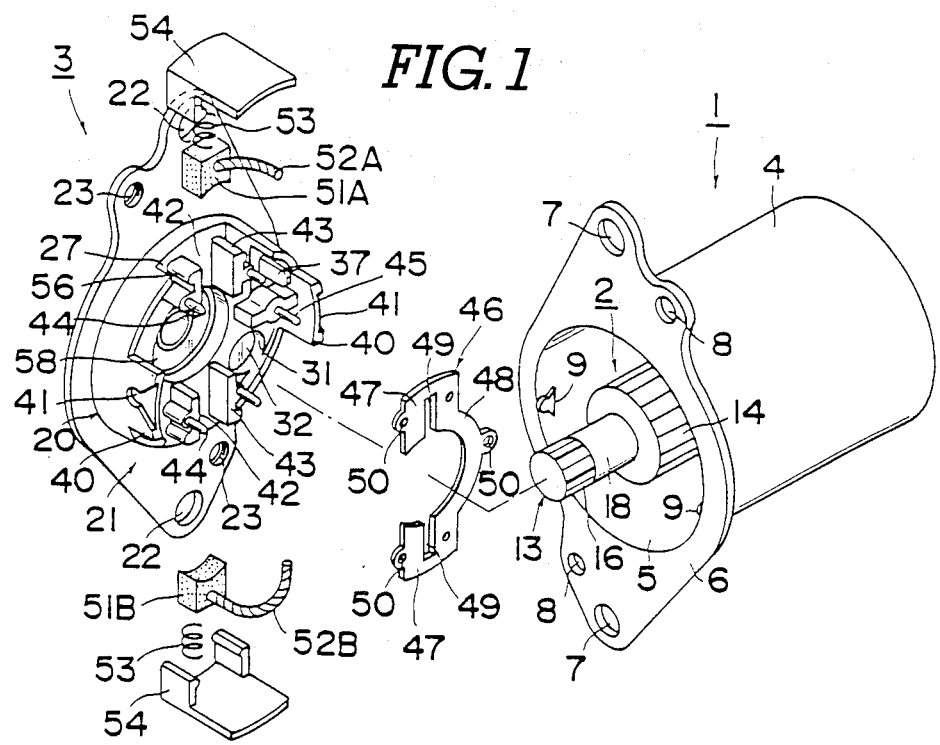
FIG. 1 is a disassembled perspective view showing one embodiment of the starter motor according to the present invention.

Referring to the drawings, a starter motor in one embodiment shown in FIGS. 1 to 7 includes a stator 1, a rotor 2 and a brush unit 3.

The stator 1 is formed integrally with a yoke 4 by use of a magnetic material through a suitable process such as drawing, pressing and the like. The yoke 4 is formed into a generally cylindrical shape, which is opened at one end face and blocked at the other end face. A flange portion 6 is radially raised from the outer brim of an opening 5 of the yoke 4, and the flange portion 6 is formed with a pair of bolt insertion holes 7 and a pair of screw insertion holes 8, with both pairs being arranged in the vertical directions, respectively. Projectingly provided at the inner brim of the opening 5 of the yoke 4 are a pair of rotation-locking projections 9 arranged in the lateral direction. Formed at the blocked surface wall of the rear end face of the yoke 4 is a cylindrical bearing member housing portion 10, into which is coupled a bearing member 11. A plurality of magnets 12 are fixed to the inner peripheral surface of the yoke 4 at regular intervals in the circumferential direction so as to form a magnetic field.

The rotor 2 is provided with a shaft 13 longer than the length of the yoke 4. A commutator 14 and an armature 15 are fixed to the outer periphery of the intermediate portion of the shaft 13 as arranged in the longitudinal direction of the shaft 13. Cuttingly provided on the forward end portion of the shaft 13 is a pinion 16, which is in mesh with a ring gear 17 of an engine in an assembled state. Journal portions 18 and 19 are formed on the outer periphery of the shaft 13, being disposed at a position immediately after the pinion 16 and a position at the rear end portion of the shaft 13, respectively. The shaft 13 is supported at both journal portions thereof on a bearing member 58 to be described later and on the bearing member 11 provided on the yoke 4, whereby the shaft 13 is rotatably journally supported in the yoke 4.

The brush unit 3 is provided with a brush holder 20 made of synthetic resin and formed into a generally disc-shape in a unitary structure, and the brush holder 20 is integrally formed with a bracket 21.

Figure 2:
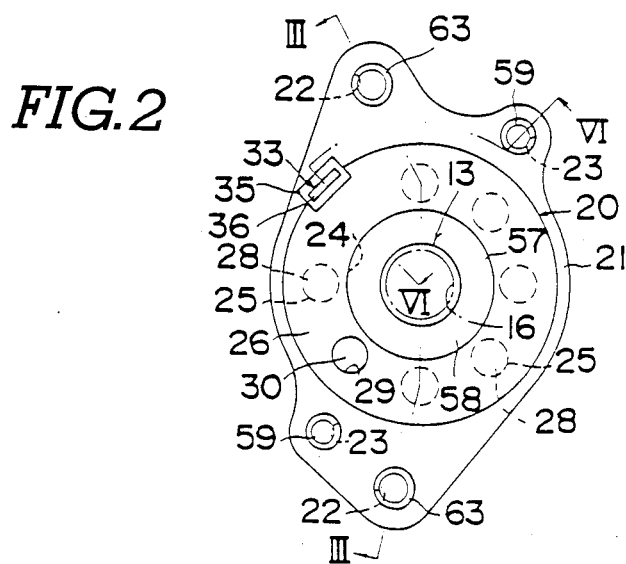
FIG. 2 is a front view showing an assembled state thereof.
Figure 3:
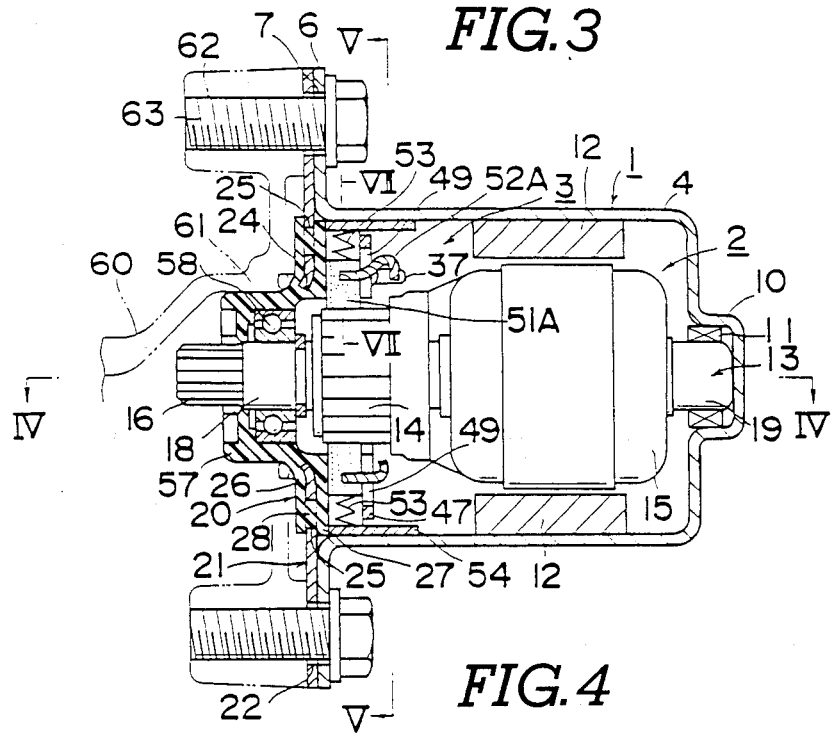
FIG. 3 is a sectional view taken along the line III—III in FIG. 2.
Figure 4:
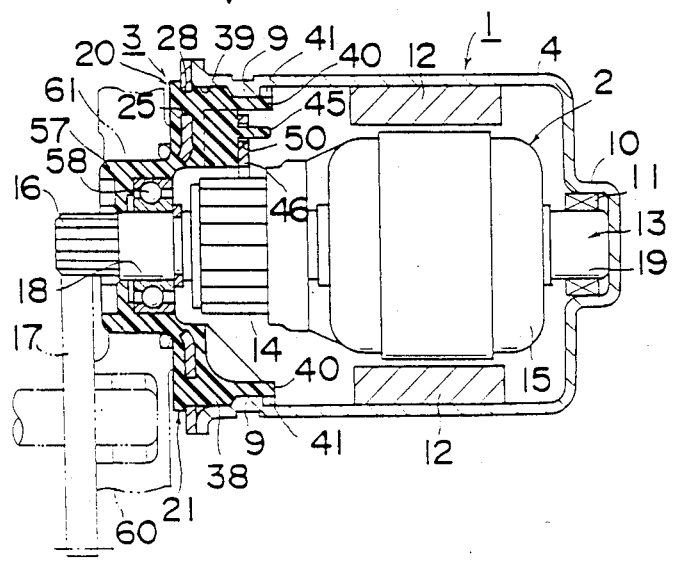
FIG. 4 is a sectional view taken along the line IV—IV in FIG. 3.
Figure 5:
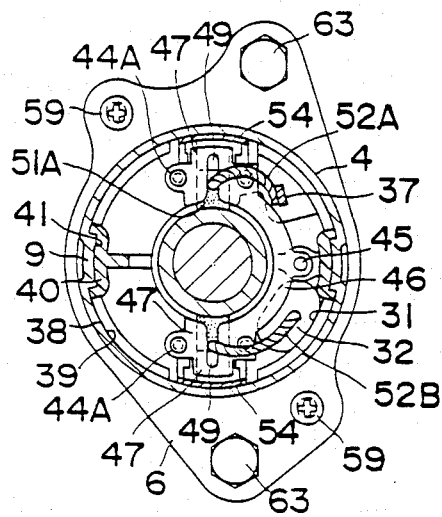
FIG. 5 is a sectional view taken along the line V—V in FIG. 3.

The bracket 21 is formed into a flat plate shape as shown in FIG. 2 by use of a plate member such as an iron plate, etc. having electric conductivity by punch press work in a manner to follow the configuration of the flange portion 6 of the yoke 4. The bracket 21 is formed with a pair of bolt insertion holes 22 and a pair of screw thread-in threaded holes 23 being arranged in the vertical directions, respectively.

Formed in the substantially central portion of the bracket 21 is a window hole 24 having the inner diameter slightly larger than the outer diameter of the commutator 14. A plurality of small holes 25 are formed around the window hole 24, being arranged in the circumferential direction. The bracket 21 is disposed to substantially perpendicularly intersect the axis of the brush holder 20 when the brush holder 20 is formed and implanted thereto, whereby the bracket 21 is integrally formed with the brush holder 20 in such a manner that a portion of the bracket 21 from the inner brim of the window hole 24 to the small holes 25 is clamped between a front wall portion 26 and a rear wall portion 27 of the brush holder 20. In this state, portions of the resin forming the brush holder 20 bury the small holes 25 of the bracket 21 to form solid columnar portions 28, respectively. The bracket 21 and the brush holder 20 are integrally formed in a completely rotation-locked state by these columnar portions 28.

A hole portion 29 is opened at a position in a direction of substantially 45° relative to the vertical line in the lower left corner portion of the front wall portion 26 of the brush holder 20 in a manner to expose the grain of the bracket 21. An exposed surface portion of the bracket 21 forms an electrode contacting portion 30 for connecting a pigtail thereto as described hereinafter. Similarly, a rear surface hole portion 31 is opened at a position opposed to the front hole portion 29 in a rear wall portion 27 of the brush holder 20. An exposed surface portion of this bracket 21 forms a pigtail connecting portion 32 for connecting a pigtail thereto.

Figure 6:
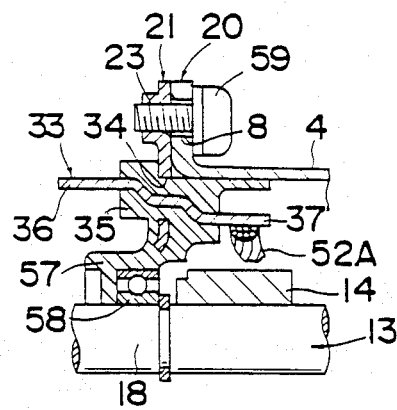
FIG. 6 is a partially sectional view taken along the line VI—VI in FIG. 2.

Furthermore, as shown in FIG. 6, a terminal member 33 is embedded at a predetermined position of the brush holder 20 in a manner to penetrate through the bracket 21 in an insulated condition.

More specifically, an insertion hole 34 slightly larger in width and thickness than the terminal member 33 is opened at a position in a direction of substantially 45° relative to the vertical line in the upper left corner portion of the bracket 21, and the terminal member 33 is inserted through this insertion hole 34 when the bracket 21 is implanted into the brush holder 20. When the brush holder 20 is formed of resin, the terminal member 33 is fixedly held by a holding portion 35 of a generally rectangular parallelopiped formed by burying the insertion hole 34.

A portion of the terminal member 33 projecting forwardly from the holding portion 35 forms a lead wire connecting portion 36, and a portion of the terminal member 33 projecting rearwardly from the holding portion 35 forms a second pigtail connecting portion 37.

The outer diameter of the brush holder 20 at the rear wall portion 27 is substantially equal to the inner diameter of the opening 5 of the yoke 4 and both diameters are center-aligned with each other, so that the outer periphery of the rear wall portion 27 and the inner periphery of the opening 5 of the yoke 4 substantially constitute an external faucet joint portion 38 and an internal faucet joint portion 39.

A pair of rising walls 40 are erected from the lateral positions on the outer edges of the rear surface of the rear wall portion 27 substantially in parallel to the axis, respectively, and rotation-locking recesses 41 each having an inverted triangular shape with a circle being attached to a vertex thereof are depressingly formed on outwardly directed surfaces of both rising walls 40. In a connected state of the external and internal faucet joint portions 38 and 39, the rotation-locking projections 9 projecting from the inner brim of the opening 5 of the yoke 4 are coupled into both rotation-locking recesses 41, respectively. Both rotation-locking projections 9 and recesses 41 may be arranged in symmetry as shown; however, when arranged in asymmetry, the direction of the brush unit 3 being assembled to the yoke 4 can be specified, so that a possibility of error in assembling can be eliminated. Additionally, the rotation-locking projections 9 may be formed into a circle, or the rotation-locking projections and recesses 9 and 41 may be formed into other shapes.

A pair of opposing brush housing chambers 42 are arranged in the vertical direction on the rear surface of the rear wall portion 27. These brush housing chambers 42 are each formed into a substantially hollow rectangular parallelopiped being opened at both end faces in the radial direction and the rear surface by a pair of opposing guide walls 43 raised in parallel to each other.

Projecting from the rear surface of the guide walls 43 are pins 44 for forming stake portions 44A, respectively. Furthermore, projecting at a position inwardly of one of the rising walls 40 is a pin 45 for positioning a fall-off preventing plate to be described later.

The openings of the brush housing chambers 42 are blocked by a brush holder plate 46 fixed by pins in a state of being abutted against the rear surface of the guide walls 43. Due to the presence of this brush holder plate 46, the rear surfaces' sides of the brush housing chambers 42 can be formed to open in the axial direction, so that the removal from the mold in the axial direction can be easily performed.

More specifically, the brush holder plate 46 is formed of an insulating plate such as a resin and includes a pair of cover portions 47 opposed to both brush housing chambers 42 and each being of a generally square shape and a connecting portion 48 of a generally semi-circularly arcuate shape, for connecting cover portions 47 to each other. Formed in the central portions of both cover portions 47 and in the radial direction are pigtail insertion holes 49. Small holes 50 are formed at positions of opposite sides of the pigtail insertion hole 49 of both cover portions 47 and at a position in the center of the connecting portion 48. In the brush holder plate 46, the pins 44 and 45 are inserted through the small holes 50, whereby the brush holder plate 46 is positioned by the brush holder 20 to be brought into abutting contact with the rear surfaces of the guide walls 43. In this state of abutting contact, the pins 44 projecting from the guide walls 43 are fused and staked to form the stake portions 44A. The brush holder plate 46 is fixed to the brush holder 20 by the group of the stake portions 44A and the positioning pin 45 in a state of blocking the brush housing chambers 42.

A pair of brushes 51A and 51B are directed inwardly and radially movably inserted into both brush housing chambers 42, and the pigtails planted in both brushes 51A and 51B are slidably inserted through the insertion holes 49 formed in the brush holder plate 46 as arranged in the vertical direction. The tail end of the pigtail 52A of the brush 51A disposed at the upper side is welded to the pigtail connecting portion 37 of the terminal member 33, and the tail end of the pigtail 52B of the brush 51B disposed at the lower side is welded to the pigtail connecting portion 32 of the bracket 21, so that the brushes 51A and 51B are electrically connected to the terminal member 33 and the bracket 21, respectively.

A pair of springs 53 are inserted through outwardly directed openings of the brush housing chambers 42, being in contact with the outer surfaces of the brushes 51A and 51B of the brush housing chambers 42. Each of the springs 53, taking a reaction force at a cap 54 caught by the outwardly directed opening of the brush housing chamber 42, biases the brush inwardly to be pressed against the commutator 14 of the rotor 2.

Figure 7:
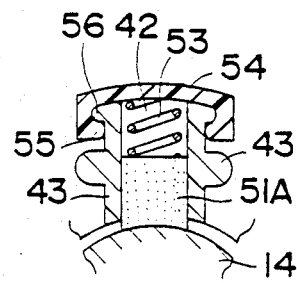
FIG. 7 is a partially sectional view taken along the line VII—VII in FIG. 3.

As shown in FIG. 7, the cap 54 is integrally formed into a generally U-shape cross section by use of synthetic resin, and, when pressed against the brush housing chamber 42, engageable portions 55 inwardly projecting from opposite wall portions of the cap 54 are engaged with engageable portions 56 projecting from the opposite sides of the outer brim of the outwardly directed opening of the brush housing chamber 42 through the resiliency of the resin, so that the cap 54 can be caught by the brush housing chamber 42. The cap 54 is raised rearwardly from the brush holder plate 46, so that the pigtails 52A, 52B can be insulated from the yoke 4. Furthermore, the cap 54 is made lower than the rising walls 40 of the brush holder 20 or other rising portions, whereby the cap 54 is not abutted against the yoke 4 in the initial stage during assembling, so that the cap 54 can be prevented from falling off.

A generally cylindrical bearing member-housing portion 57 is forwardly protruding at a position of the brush holder 20 opposed to the window hole 24 of the bracket 21, and a bearing member 58 formed of a ball bearing or the like is accurately center-aligned with this housing portion 57 and coupled thereinto. The axis of this housing portion 57 is designed to be aligned with the axis of the external faucet joint portion 38 formed by the outer periphery of the rear wall portion 27 of the brush holder 20. In consequence, the axis of the bearing member 58 center-aligned with the housing portion 57 and housed therein is aligned with the axis of the external faucet joint portion 38.

In the state where the brush unit 3 with the above-described arrangement is assembled to the stator 1 and the rotor 2, the brush holder 20 is faucet-jointed to the opening 5 of the yoke 4 through the external and the internal faucet joint portions 38 and 39 formed on the outer periphery and the inner periphery of the brush holder 20 and the opening 5 of the yoke 4, whereby the brush holder 20 and the yoke 4 are center-aligned with each other. In this state, the bearing member 58 is center-aligned with the external faucet joint portion 38 of the brush holder 20, whereby the bearing member 58 is center-aligned with the axis of the yoke 4 as well. In consequence, the shape 13 of the rotor 2, being supported at the journal portions 18 and 19 thereof on this bearing member 58 and the bearing member 11 disposed at the rear end portion of the yoke 4, is accurately center-aligned with the stator 1 and rotatably supported thereon.

When the opening 5 of the yoke 4 and the brush holder 20 are faucet-jointed to each other, the rotation-locking projections 9 and the rotation-locking recesses 41 are matched and coupled to each other. When the projections 9 and the recesses 41 are coupled to each other, the bolt insertion hole 7 and the screw insertion hole 8 of the flange portion 6 of the yoke 4 are matched with the bolt insertion hole 22 and the screw thread-in threaded hole 23 of the bracket 21, respectively. As shown in FIG. 6, when the screw 59 is inserted through the insertion hole 8 of the flange portion 6 of the yoke 4 and threadably coupled into the threaded hole 23, the bracket 21 and the yoke 4 are connected to each other, whereby the stator 1, the rotor 2 and the brush unit 3 are integrally connected to one another by one effort, with the axes and the positions thereof being matched with one another.

In this state where three members are integrally connected to one another, the bearing member housing portion 57 of the bracket 21 is coupled into a boss portion 61 of an engine case 60. If it is designed that the boss portion 61 of the engine case 60 and the axis of the bearing member housing portion 57 are center-aligned with each other, then the shaft 13 supported by the bearing member 58 of the bearing member housing portion 57 is center-aligned with the boss portion 61. Because of this, the pinion 16 cuttingly provided on the shaft 13 accurately comes into meshing engagement with the ring gear 17.

When the bearing member housing portion 57 of the bracket 21 is coupled to the boss portion 61 of the engine case 60, the front surface of the bracket 21 is brought into abutting contact with the rear surface of the engine case 60, whereby, in this state, the bolt insertion holes 7 and 22 are matched with the bolt thread-in threaded hole 62 of the engine case 60. Then, when the bolt 63 is inserted through the insertion holes 7 and 22 and threadably coupled into the threaded hole 62, the yoke 4 and the bracket 21 are simultaneously tightened, so that a composite body of the stator 1, the rotor 2 and the brush unit 3 can be firmly fixed to the engine case 60 by one effort and connected electrically with each other.

According to this embodiment, the bracket is integrally formed with the brush holder by insert molding, whereby means for fastening the bracket to the brush holder can dispensed with, so that the number of parts and the number of man-hours for assembling can be reduced.

The bracket is formed into a thin plate by the press work, whereby the wall thickness can be decreased and rendered light in weight as compared with the case of die casting, so that the total length in the direction of axis and the total weight of the starter motor can be decreased.

The faucet joint portion can be simultaneously formed on the brush holder when the brush holder is integrally formed with the bracket, whereby the machining for forming the faucet joint portion can be omitted, so that the productivity can be improved conjointly with the reduction in the number of parts and the number of manhours for assembling, thus enabling to promote the cost reduction.

The terminal member is integrally formed with the brush holder together with the bracket by insert molding, so that the assembling work exclusively performed for the terminal member can be omitted.

The brush holder plate is coupled to the pins projecting from the outer surface of the brush housing chambers and the pins are fused and staked, so that the positioning of the brush holder plate and the fixing work thereof can be simplified.

Such an arrangement that the brush housing chambers are covered by the caps is adopted, whereby the springs can be inserted through the outwardly directed openings, so that the assembling workability can be improved.

Furthermore, the present invention need not necessarily be limited to the above embodiment, and, needness to say that various modifications can be achieved within the scope not departing from the gist of the present invention.

For example, the bearing member housing portion need not necessarily be one integrally formed with the brush holder, and the arrangements shown in FIGS. 8 and 9 may be adopted.

In FIG. 8, a bearing member housing portion 57A is integrally formed with a portion of a window hole 24A of a bracket 21 to provide a cylindrical shape by a suitable process such as drawing. Metal-to-metal contact for the bearing is shown.

In FIG. 9, a bearing member housing portion 57B is formed in cooperation by a cylindrical portion 57c integrally formed with a portion of a window hole 24B of a bracket 21 to provide a cylindrical shape and a resin cover portion 57d formed to cover the inner peripheral surface of this cylindrical surface and a portion of a blocked surface of this cylindrical portion 57e.

As has been described hereinabove, according to the present invention, the bracket is formed into a thin plate shape and this bracket is integrally formed with the brush holder made of resin, so that the bracket can be rendered thin in wall thickness and light in weight, and means for fastening the bracket to the brush holder can be omitted.

What is claimed is:

1. A bracket for a starting motor formed integrally with a brush holder wherein said brush holder is formed of resin and is solidly secured to a bracket of metal and said bracket is jointed to an opening of a yoke, characterized in that:

said bracket is formed into a thin plate shape;

a portion of resin of said brush holder is molded through a hole of said bracket from one surface to the other surface of said bracket, wherein said bracket is inserted into said brush holder preliminary and thereafter molded together with it, whereby said brush holder is integrally formed with said bracket;

a faucet joint portion of said brush holder is formed when said brush holder is formed of resin;

said faucet joint portion is faucet-jointed to an opening of said yoke, whereby said bracket is center-aligned with said yoke;

said bracket is contacted directly with said yoke;

said bracket has a mounting hole matched with a mounting hole of said yoke;

the inner periphery of said bearing member housing portion makes direct metal-to-metal contact with a bearing; and the outer periphery of said bearing member housing portion is formed to provide a faucet joint portion for mounting to an engine case, whereby the outer periphery of said bearing member housing portion makes direct metal-to-metal contact with said engine case.

2. A bracket as set forth in claim 1, wherein said brush holder includes a brush holder plate for receiving brushes.

3. A bracket as set forth in claim 1, wherein said brush holder has an inner diameter side and an outer diameter side and caps snap-fit onto the brush holder on the outer diameter's side.

4. A bracket as set forth in claim 3, wherein said caps electrically insulate pigtails of brushes from said yoke.

5. A bracket as set forth in claim 1, wherein rotation-locking recesses to be coupled to rotation-locking projections are formed on said faucet joint portion of the brush holder.

6. A bracket as set forth in claim 4, wherein said caps are lower in height than rising walls formed on said brush holder.

7. A bracket for a starting motor formed integrally with a brush holder wherein a brush holder formed of resin is solidly secured to a bracket of metal and said bracket is jointed to an opening of a yoke, characterized in that:

said bracket is formed into a thin plate shape;

a portion of resin of said brush holder is molded through a hole of said bracket from one surface to the other surface of said bracket, wherein said bracket is inserted into said brush holder preliminary and thereafter molded together with it, whereby said brush holder is integrally formed with said bracket;

a faucet joint portion of said brush holder is formed when said brush holder is formed of resin;

said faucet joint portion is faucet-jointed to an opening of said yoke, whereby said bracket is center-aligned with said yoke;

said bracket is contacted directly with said yoke;

said bracket has a mounting hole matched with a mounting hole of said yoke;

the inner periphery of said bearing member housing portion makes direct metal-to-metal contact with a bearing;

the outer periphery of said bearing member housing portion is formed to provide a faucet joint portion for mounting to an engine case, whereby the outer periphery of said bearing member housing portion makes direct metal-to-metal contact with said engine case;

a terminal of a brush penetrates through a resin material of said brush holder and is extracted to the outside; and further a terminal to which a pigtail of one brush is held by the resin material of said brush holder is connected to said bracket.

* * * * *